US008540256B1

(12) United States Patent
Simpson

(10) Patent No.: US 8,540,256 B1
(45) Date of Patent: Sep. 24, 2013

(54) UP-RIGHT WALKER FOR SUPPORTING A PATIENT WITH UP-RIGHT POSTURE

(71) Applicant: Thomas Grady Simpson, Oak Ridge, TN (US)

(72) Inventor: Thomas Grady Simpson, Oak Ridge, TN (US)

( * ) Notice: Subject to any disclaimer, the term of this patent is extended or adjusted under 35 U.S.C. 154(b) by 0 days.

(21) Appl. No.: 13/663,719

(22) Filed: Oct. 30, 2012

(51) Int. Cl.
*B62M 1/00* (2010.01)
*A61H 3/00* (2006.01)

(52) U.S. Cl.
USPC ....... 280/87.05; 297/5; 280/87.021; 280/639; 135/67

(58) Field of Classification Search
USPC ............. 280/7.1, 650, 87.05, 87.021, 87.041, 280/304.1; 482/66–68; 135/65, 66, 67, 74, 135/76; 188/19–20, 74–75, 166–167; 297/5, 297/DIG. 4
See application file for complete search history.

(56) References Cited

U.S. PATENT DOCUMENTS

| | | | | | |
|---|---|---|---|---|---|
| 4,251,105 | A * | 2/1981 | Barker | | 297/6 |
| 4,345,790 | A * | 8/1982 | Coe | | 297/6 |
| D298,816 | S * | 12/1988 | Burkhart et al. | | D12/133 |
| 5,020,560 | A * | 6/1991 | Turbeville | | 135/67 |
| 6,003,532 | A * | 12/1999 | Pi | | 135/67 |
| 6,743,156 | B1 * | 6/2004 | Jacques et al. | | 482/68 |
| 7,494,138 | B2 * | 2/2009 | Graham | | 280/87.021 |
| 7,992,584 | B1 * | 8/2011 | Birnbaum | | 135/67 |
| 8,215,652 | B2 * | 7/2012 | Dashew et al. | | 280/87.05 |
| 2008/0185797 | A1 * | 8/2008 | Bohn | | 280/7.1 |
| 2009/0224499 | A1 * | 9/2009 | Dashew et al. | | 280/87.05 |

* cited by examiner

*Primary Examiner* — John Walters
*Assistant Examiner* — James Triggs

(57) ABSTRACT

An up-right walker for supporting a patient with up-right posture. The up-right walker includes side frames having a back leg frame and a front leg frame. Wheels are coupled to the back leg frame and to front leg frame for contacting a surface for enabling motion. A first support frame is disposed at the top of the first side frame and a second forearm support frame disposed at the top of the second side frame. A first support structure is coupled to the first support frame and a second support structure is coupled to the second forearm support frame. The first and second support structures are configured to have an angled slope not parallel to the surface engaged by the wheels. A knee support fixture may be provided that includes a knee support platform and a pivoting repository for receiving and supporting a knee therein.

15 Claims, 11 Drawing Sheets

UP-RIGHT WALKER FOR SUPPORTING A PATIENT WITH UP-RIGHT POSTURE

FIELD OF THE INVENTION

This disclosure relates in general to walkers for patients having difficulty with self-sustained walking, and more particularly to an up-right walker for supporting a patient with up-right posture.

BACKGROUND

Infirm or semi-invalid persons often resort to the use of walkers for mobility. Many different walkers have been developed. The most common type of walker that is used includes two spaced and braced U-shaped frame members which constitute the legs of the walker. The two spaced and braced U-shaped frame members are interconnected on one side by at least one bracing, while the other side is left open for the positioning of the user.

Using the standard walker may produce several negative issues. Most patients locate themselves behind the walker in a forward leaning position while walking. This may create both health and safety issues. One health issue is that the forward leaning position over the walker promotes bad posture and produces stress on the back, shoulders, arms, wrists and hands. Further, the forward leaning position also aggravates a variety of arthritis type issues.

The standard walker may be equipped with skid pads on at least the rear legs. Skid pads may also be implemented on the front legs, or alternatively, wheels may be provided on the front legs to facilitate movement of the patient. If skid pads are used on both the front and rear legs, the walker has to be lifted to enable the patient to move. If the front legs are instead provided with wheels, the patient is required to apply enough pushing force on the walker to overcome the resistance between the rear skid pads and the surface the patient is walking on. The amount of force the patient must apply will vary depending on the type of surfaces that the patient is walking on.

Another issue is patient safety. The primary balance and stability of the patient is maintained through the arms and hand strength of the patient while leaning over the walker. Any weakness or fatigue in these areas could jeopardize the stability of the patient.

Accordingly, there is a need for an up-right walker for supporting a patient with up-right posture.

SUMMARY OF THE INVENTION

To overcome the limitations described above, and to overcome other limitations that will become apparent upon reading and understanding the present specification; embodiments for an up-right walker for supporting a patient with up-right posture are disclosed.

The above-described problems are solved by providing a support structure that allows a user to provide vertical support thereby eliminating the tendency for a walker to move forward and out from under a user.

An embodiment includes an up-right walker, wherein the up-right walker includes a first side frame having a back leg frame and a front leg frame, a second side frame having a back leg frame and a front leg frame, wheels coupled to the back leg frame and front leg frame of the first and second side frames, the wheels arranged for contacting a surface for enabling motion, a first support frame disposed at the top of the first side frame and a second forearm support frame disposed at the top of the second side frame and a first support structure coupled to the first support frame and a second support structure coupled to the second forearm support frame, the first and second support structure configured to have an angled slope not parallel to the surface engaged by the wheels.

In another embodiment, a method for providing an up-right walker is disclosed. The method includes providing a first side frame having a back leg frame and a front leg frame, providing a second side frame having a back leg frame and a front leg frame, coupling wheels for contacting a surface for enabling motion to the back leg frame and front leg frame of the first and second side frames, providing a first support frame at the top of the first side frame and a second forearm support frame at the top of the second side frame and coupling a first support structure to the first support frame and a second support structure coupled to the second forearm support frame, wherein the coupling of the first and second support structure comprising configuring the first and second support structure to have an angled slope not parallel to the surface engaged by the wheels.

In another embodiment, another up-right walker is disclosed. The up-right walker includes a first side frame having a back leg frame and a front leg frame, a second side frame having a back leg frame and a front leg frame, wheels coupled to the back leg frame and front leg frame of the first and second side frames, the wheels arranged for contacting a surface for enabling motion, a first support frame disposed at the top of the first side frame and a second forearm support frame disposed at the top of the second side frame, a first support structure coupled to the first support frame and a second support structure coupled to the second forearm support frame, the first and second support structure configured to have an angled slope not parallel to the surface engaged by the wheels, a first hand grip provided at a distal end of the first support structure and a second hand grip provided at a distal end of the second support structure, couplers disposed on the back leg frame and the front leg frame of the first side frame and on the back leg frame and the front leg frame of the second side frame for adjusting a height of the first and second support structure relative to the surface engaged by the wheels and a first and second pivot mechanism coupling the first and second side frame to a front cross member for collapsing the first and second side frame inwardly to facilitate storage.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to providing an up-right walker for supporting a patient with up-right posture.

Figure 1:
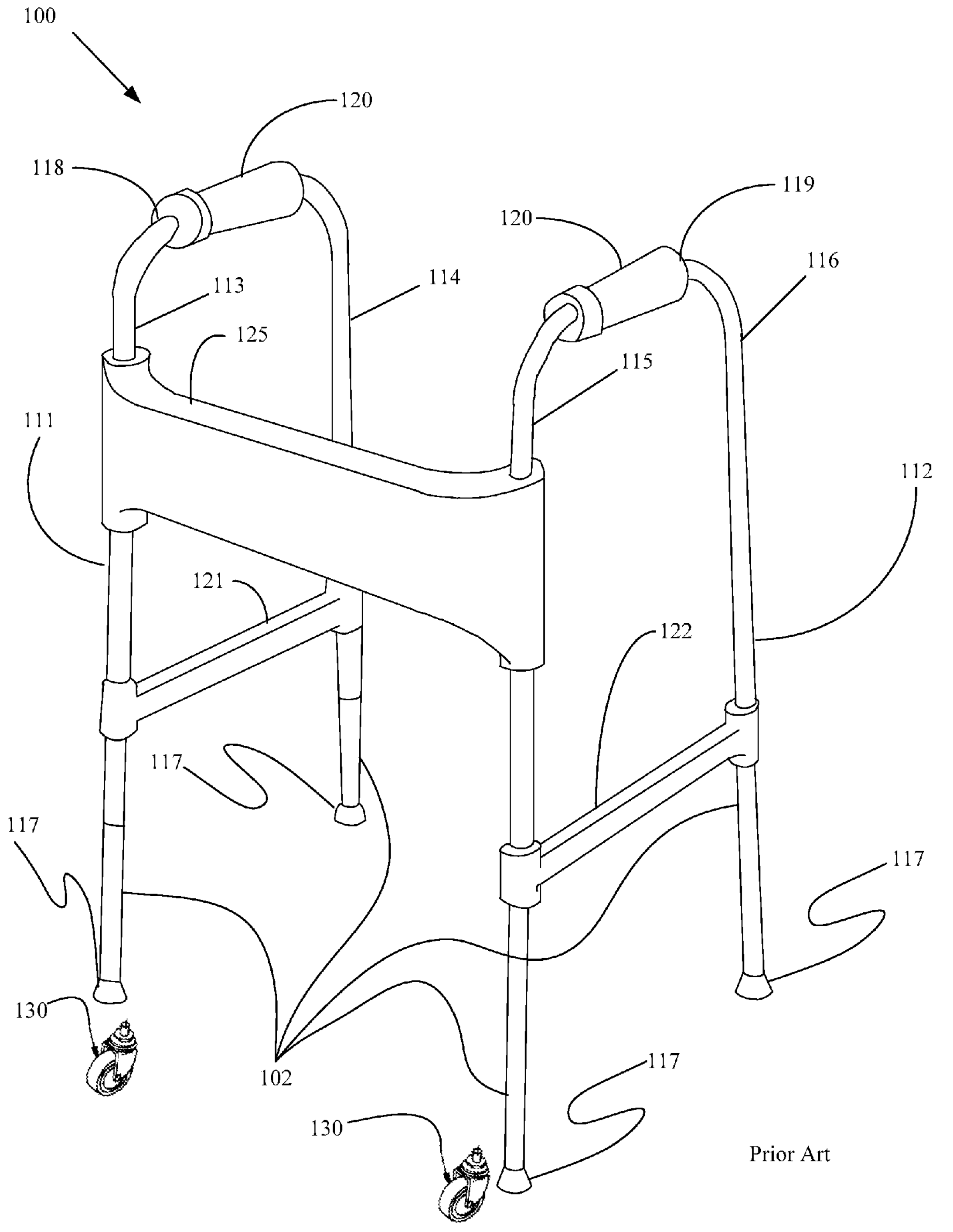
FIG. 1 illustrates one example of a standard walker.

FIG. 1 illustrates one example of a standard walker. The standard walker 100 has two, opposed, U-shaped side frames 111, 112. Side frames 111 and 112 are conventional items preferably formed of hollow metallic tubes. The branches 113 and 114 of side frame 111 and the branches 115 and 116 of side frame 112 constitute the legs 102 of standard walker 100 and may be conventionally fitted with rubber feet 117. Alternatively, at least branches 113 and 115 can be provided with wheels 130.

The top 118 of side frame interconnects leg branches 113 and 114 thereof and the top 119 of side frame 112 interconnects leg branches 115 and 116 thereof. Branches 114 and 116 are thus opposed to each other and opposed branches 113 and 115, respectively. Tops 118 and 119 may each telescopically receive a grip sleeve 120 made of a soft, comfortable material so that the user may manipulate walker 110 in a conventional manner. Leg branches 113 and 114 of side frame 111 may be interconnected for structural support by a side brace 121. Similarly, leg branches 115 and 116 of side frame 112 may be interconnected by a side brace 122. A front brace or cross-member 125 couples side frames 111, 112.

Figure 2A:
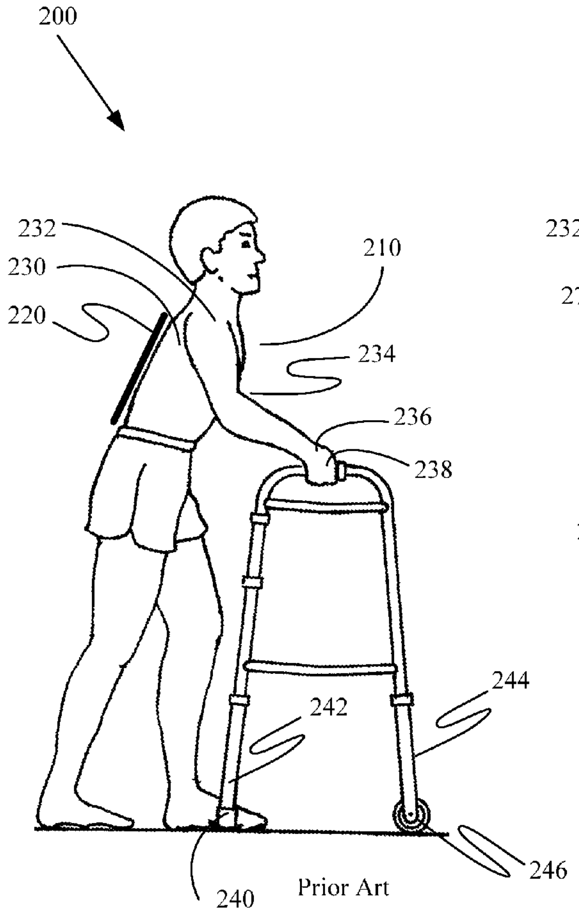
FIG. 2*a* illustrates the use of a standard walker as described above with reference to FIG. 1.

FIG. 2*a* illustrates the use of a standard walker 200 as described above with reference to FIG. 1. In FIG. 2, the patient 210 is shown holding the standard walker 200 for support while walking. The patient 210 is positioned behind the walker 200 in a forward leaning position 220 while walking. However, the forward leaning position 220 required by the standard walker 200 may create both health and safety issues.

One health issue is that the forward leaning position 220 over the walker 200 promotes bad posture and produces stress on the back 230, shoulders 232, arms 234, wrists 236 and hands 238. Further, the forward leaning position 220 may also aggravate a variety of arthritis type issues.

As shown in FIG. 2*a*, the standard walker 200 is equipped with skid pads 240 on at least the rear legs 242. Skid pads may also be implemented on the front legs 244, or alternatively, as shown in FIG. 2*a*, wheels 246 may be provided on the front legs 244 to facilitate movement of the patient 210. If skid pads 240 are used on both the front 244 and rear 242 legs, the standard walker 200 has to be lifted to enable the patient 210 to move. This is very cumbersome and requires the patient 210 to provide complete support of the patient's weight without leaning on the standard walker 200 while the patient 210 lifts the standard walker 200 and moves the standard walker 200 in the direction the patient 210 desires to move.

To overcome this drawback, the standard walker 200 often includes wheels 246 attached to the front legs 244. By placing wheels 246 on the front legs 244, the patient 210 is only required to apply enough pushing force on the standard walker 200 to overcome the resistance between the rear skid pads 240 and the surface 248 the patient is walking on. The amount of force the patient 210 must apply will vary depending on the type of surfaces 248 that the patient is walking on. While the patient 210 may be supported by the standard walker 200 during movement, the forward leaning position 220 over the standard walker 200 promotes bad posture, produces bodily stress and may aggravate a variety of arthritis type issues.

Another issue associated with the standard walker 200 is patient safety. The primary balance and stability of the patient 210 is maintained through their arms 234 and hand 238 strength while leaning over the standard walker 200. Any weakness or fatigue in these areas could jeopardize the stability of the patient 210.

Figure 2B:
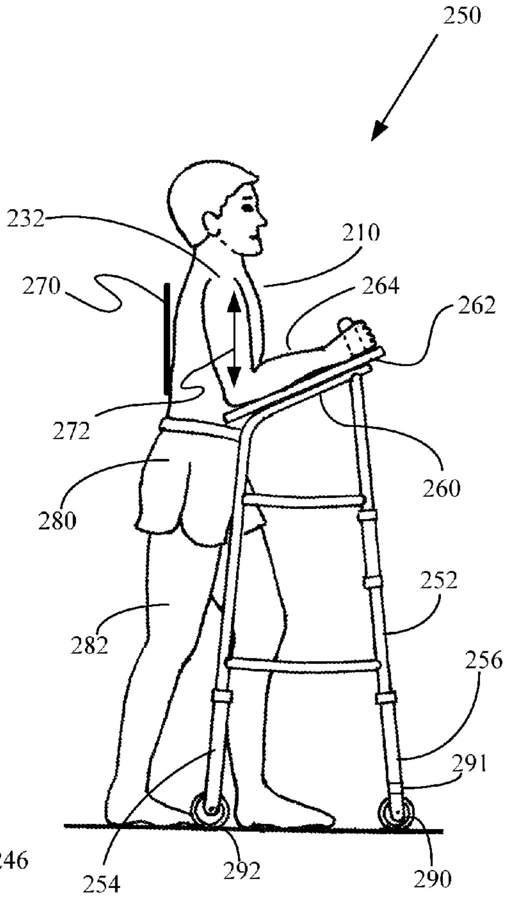
FIG. 2*b* illustrates an up-right walker according to an embodiment.

FIG. 2*b* illustrates an up-right walker 250 according to an embodiment. The up-right walker 250 is designed to eliminate the negative features that exist with the standard type walker. In FIG. 2*b*, the up-right walker 250 according to an embodiment includes a side frame 252. The rear legs 254 and front legs 256 of side frame 252 are used to support the up-right walker 250. The top 260 of side frame 252 is angled and includes a support structure 262 for supporting the forearms 264 of the patient 210. Thus, as shown in FIG. 2*b*, the body of the patient 210 is positioned closer into the framework of the up-right walker 250. This enables the patient 210 to be in a natural up right position 270 while walking. The body of the patient 210 becomes easily balanced by the vertical support 272 from the shoulders 232 to the forearms 264. As the forearms 264 of the patient 210 rest comfortably on the support structure 262, a substantial portion of the upper body weight of the patient 210 is automatically transferred directly onto the up-right walker 250. The portion of body weight of the patient 250 transferred directly onto the up-right walker 250 may vary depending on the condition of the patient 210. Nevertheless, the direct transfer of the body weight of the patient 210 onto the up-right walker 250 reduces pressure and gives relief to the back 230, hips 280 and legs 282. The up-right walker 250 eliminates the need for any skid pads on the rear legs 254 to prevent the up-right walker 250 from rolling out from under the patient. Rather, the up-right walker 250 includes wheels 290, 292 on all four legs. Having wheels 290, 292 on all four legs enables the patient 210 to walk with greater ease and stability. Because the patient 210 is supported in an up-right position 270 with the weight of the patient 210 applied vertically to the up-right walker 250, the up-right walker 250 does not have a tendency to roll out from under the patient 210. The ease of use and stability produces a greater desire to engage is walking by patients. For even greater mobility, wheels 290 may be moveably coupled to the frame with a socket 291 to allow the wheels 290 to turn. Alternatively, the wheels 290 may be capable of turning, such as with ball casters.

Figures 3A, 3B:
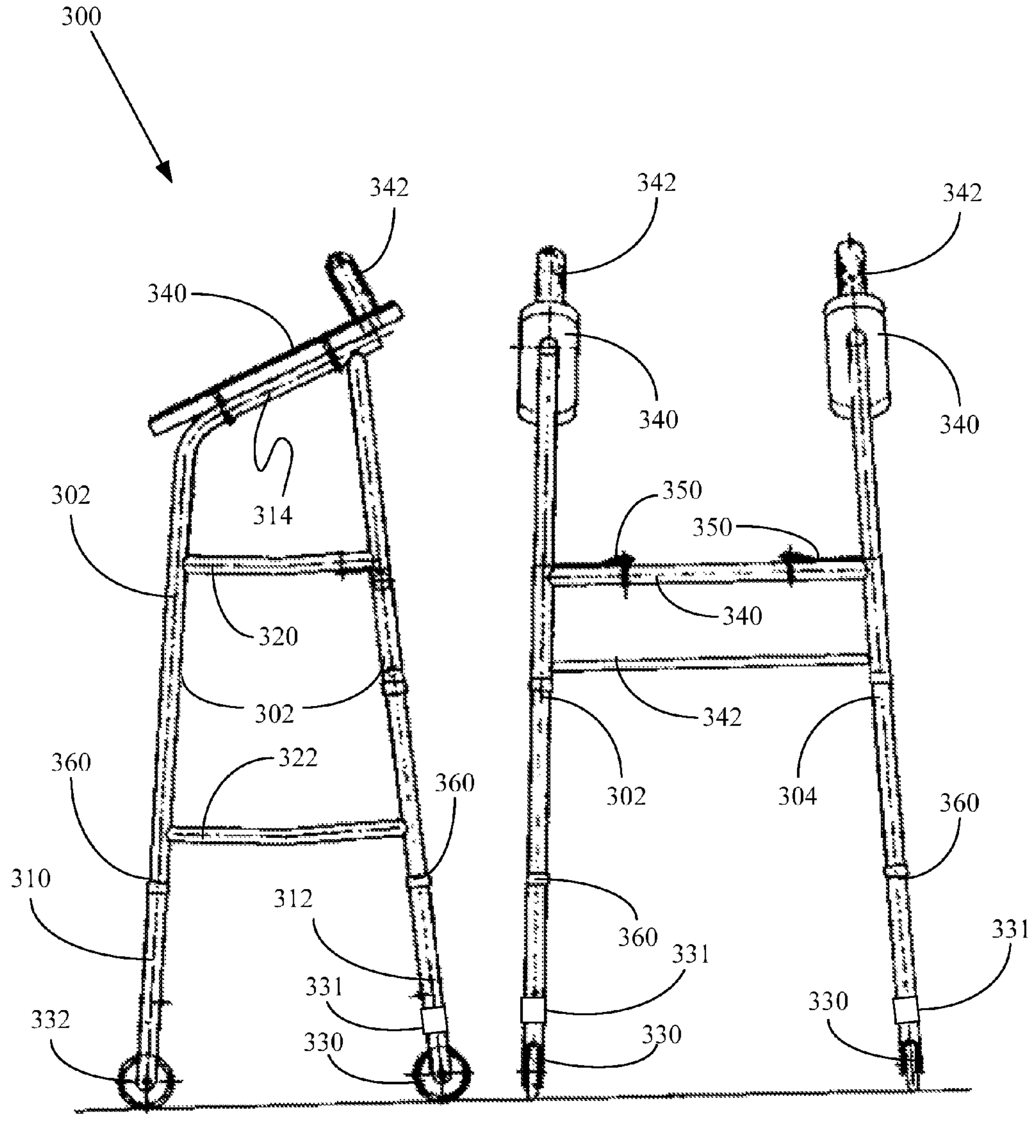
FIGS. 3*a*-*b* illustrate a side and front view of the up-right walker according to an embodiment.

FIGS. 3*a*-*b* illustrate a side and front view of the up-right walker 300 according to an embodiment. FIG. 3*a* shows a first side frame 302 having a back leg frame 310 and a front leg frame 312. The back leg frame 310 curves at the top to form a support frame 314. Those skilled in the art will recognize that the support frame 314 of embodiments described herein is not meant to be limited to any particular angle. Rather, the angle of the support frame is chosen for the comfort of the patient. Further, the angle of the support frame 314 may be fixed or adjustable.

At a front end of the curved portion of the back leg frame 310, the leg frame 310 is coupled to the front leg frame 312. The back leg frame 310 and the front leg frame 312 are also coupled by cross members 320, 322. The cross members 320, 322 provide added strength to the side frame 302. Front wheels 330 are coupled to the back leg frame 310 and rear wheels 332 are coupled to the front leg frame 312 to allow ease of movement. Front wheels 330 may be moveably coupled to the frame with a socket 331 to allow the wheels 330 to turn. Alternatively, the wheels 330 may be capable of turning, such as with ball casters.

A support structure 340 is coupled to the support frame 314. A hand grip 342 may be provided at a distal end of the support structure 340 or to the support frame 314 to allow the patient to hold on to while walking. In one embodiment, the hand grips 342 may be removeable. Couplers 360 may be provided on the back leg frame 310 and the front leg frame 312 to allow the height of the up-right walker to be adjusted. Those skilled in the art will recognize that the couplers may be located anywhere along the back leg frame 310 and front leg frame 312 to allow the user to adjust the couplers 360 so the height of the up-right walker 300 to match the patients height requirements.

FIG. **3*b* shows the front view of the up-right walker 300 according to an embodiment. FIG. 3*b* shows a first 302 and second 304 side frame. The first 302 and second 304 side frames are coupled to a first and second cross member 340, 342 to provide structural support and strength to the up-right walker 300. The up-right walker 300 may also include a pivot mechanism 350 that may be engaged to allow the first 302 and second 304 side frames to collapse inwardly when the patient wishes to store the upright walker 300. FIG. 3*b* also shows the front wheels 330 that may be moveably coupled to the frame with a socket 331 to allow the wheels 330 to turn. Alternatively, the wheels 330 330** may be capable of turning, such as with ball casters.

As can be seen in FIGS. **3*a-b*, the patient's body may be positioned closer into the framework of the up-right walker 300 to enable the patient to be in a natural up right position while walking. The patient balances on the up-right walker by holding on to the hand grips 342 and resting the forearms on the support structure 340 to provide vertical support from the shoulders to the forearms. The support of the patient's body weight through the vertical position of the arm from the shoulders to the elbow reduces pressure and gives relief to the back, hips and legs. Further, because the patient is supported in an up-right position, the up-right walker 300 eliminates the need for any skid pads on the rear legs to prevent the up-right walker 300** from rolling out from under the patient.

Figure 4:
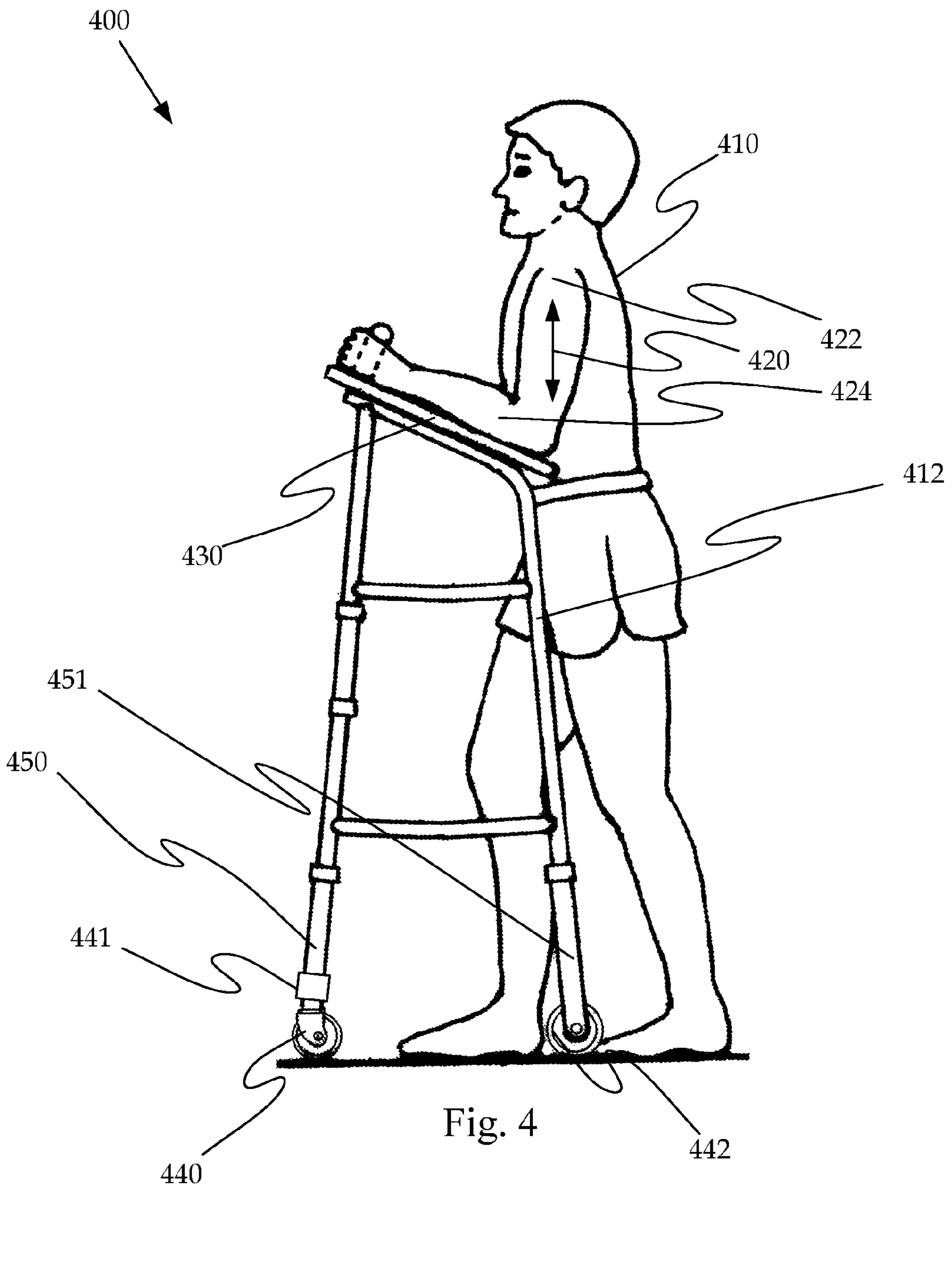
FIG. 4 illustrates a patient using an up-right walker according to an embodiment.

FIG. 4 illustrates a patient using an up-right walker 400 according to an embodiment. In FIG. 4, the up-right walker 400 eliminates the negative features that exist with the standard type walker. When using the up-right walker 400, the patient's body 410 is positioned closer into the frame work 412. This enables the patient to be in a natural up-right position while walking. The patient's body becomes easily balanced by the vertical support 420 from the shoulders 422 to the forearms 424. As the patient's forearms 424 rest on the padded support 430, approximately 20% of their upper body weight is automatically transferred directly on to the pads 430 of the up-right walker 400. This reduces pressure and gives relief to the back, hips and legs. The design of the upright walker eliminates the need for any skid pads on the rear legs 451. The up-right walker is designed with front wheels 440 and rear wheel 442 which enables the patient to walk with greater ease and stability. This should also produce a greater desire for walking. Front wheels 440 may be moveably coupled to the frame with a socket 441 to allow the wheels 440 to turn. Alternatively, the wheels 440 may be capable of turning, such as with ball casters.

Figure 5:
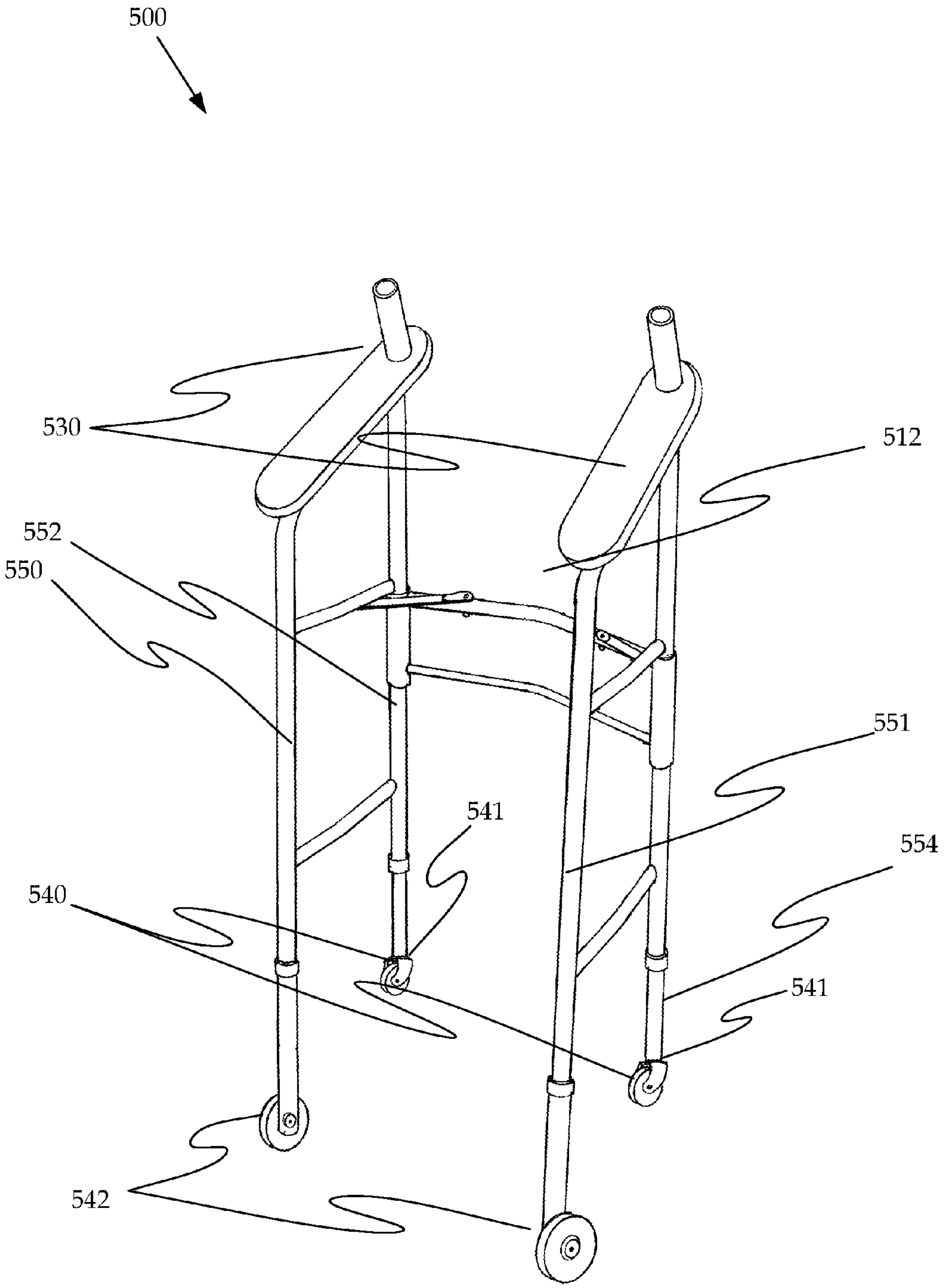
FIG. 5 illustrates a perspective view of an up-right walker according to an embodiment.
Figure 6A:
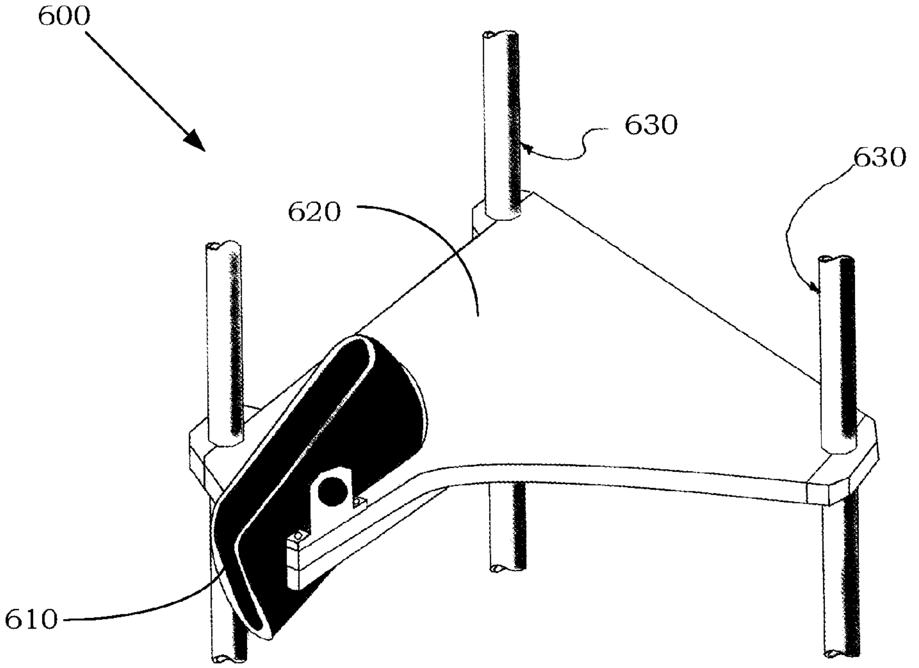
FIG. 6*a* illustrates a left knee support fixture for an up-right walker according to an embodiment.
Figure 6B:
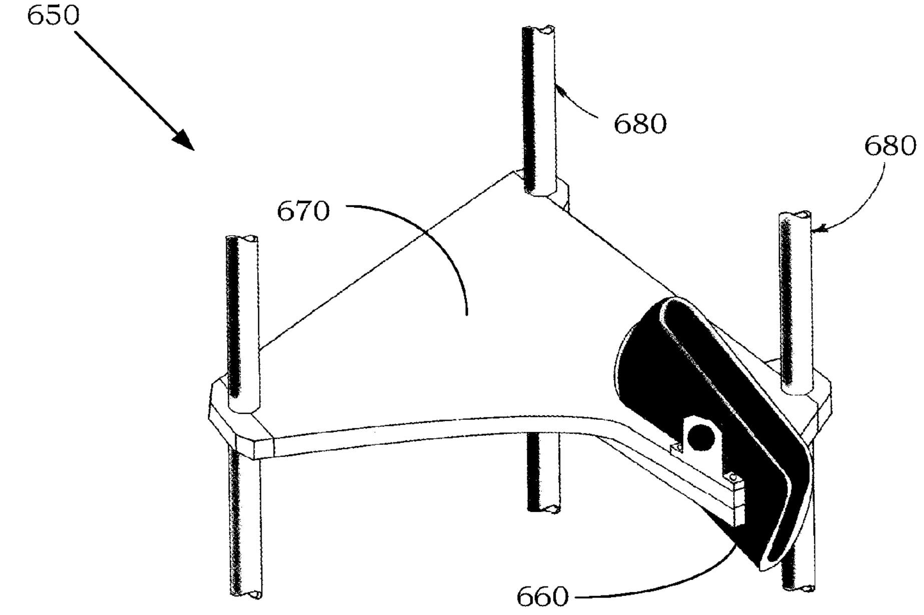
FIG. 6*b* illustrates a right knee support fixture for an up-right walker according to an embodiment.

FIG. 5 illustrates a perspective view of an up-right walker 500 according to an embodiment. In FIG. 5, the up-right walker 500 is shown with pads 530 for supporting the patient's weight. The design of the up-right walker 500 eliminates the need for any skid pads on the rear legs 550, 551. The up-right walker is designed with front wheels 540 and rear wheel 542 to enable the patient to walk with greater ease and stability. Moreover, as mentioned above, this should also produce a greater desire for walking.

Front wheels 540 may be moveably coupled to the frame with a socket 541 to allow the wheels 540 to turn. Alternatively, the wheels 540 may be capable of turning, such as with ball casters.

FIG. **6*a* illustrates a left knee support fixture 600 for an up-right walker according to an embodiment. The left knee support fixture has a pivoting repository 610 for the left knee to be received therein. The pivoting repository 610 is supported by a support platform 620 that is coupled to the legs 630** of the up-right walker.

FIG. **6*b* illustrates a right knee support fixture 650 for an up-right walker according to an embodiment. The right knee support fixture has a pivoting repository 660 for the right knee to be received therein. The pivoting repository 660 is supported by a support platform 670 that is coupled to the legs 680** of the up-right walker.

Figure 7:
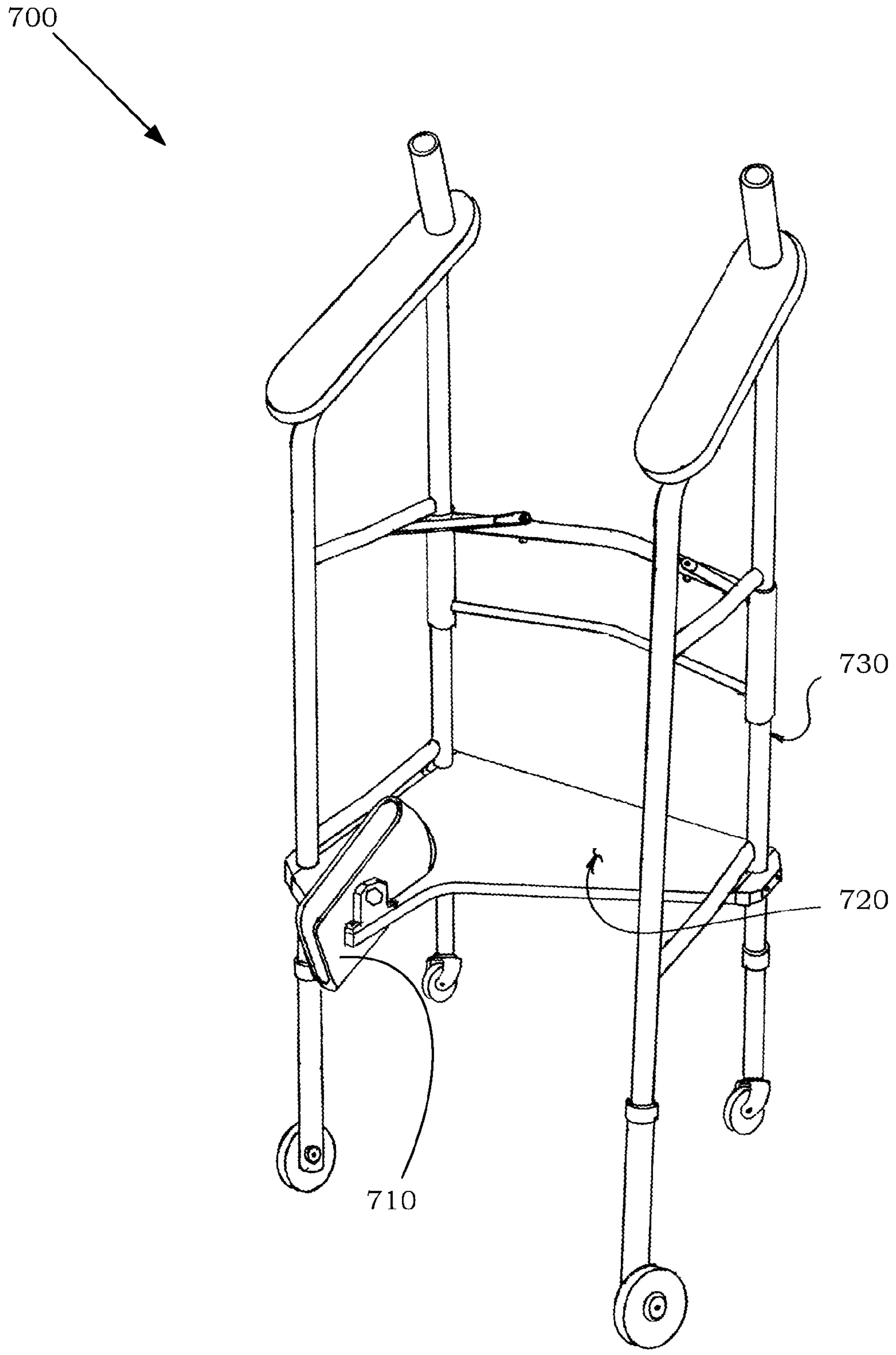
FIG. 7 illustrates a left knee support fixture coupled to an up-right walker according to an embodiment.

FIG. 7 illustrates a left knee support fixture 700 coupled to an up-right walker according to an embodiment. In FIG. 7, the left knee support fixture 700 is shown having a pivoting repository 710 for the left knee to be received therein. The pivoting repository 710 is supported by a support platform 720 that is coupled to the legs 730 of the up-right walker.

Figure 8:
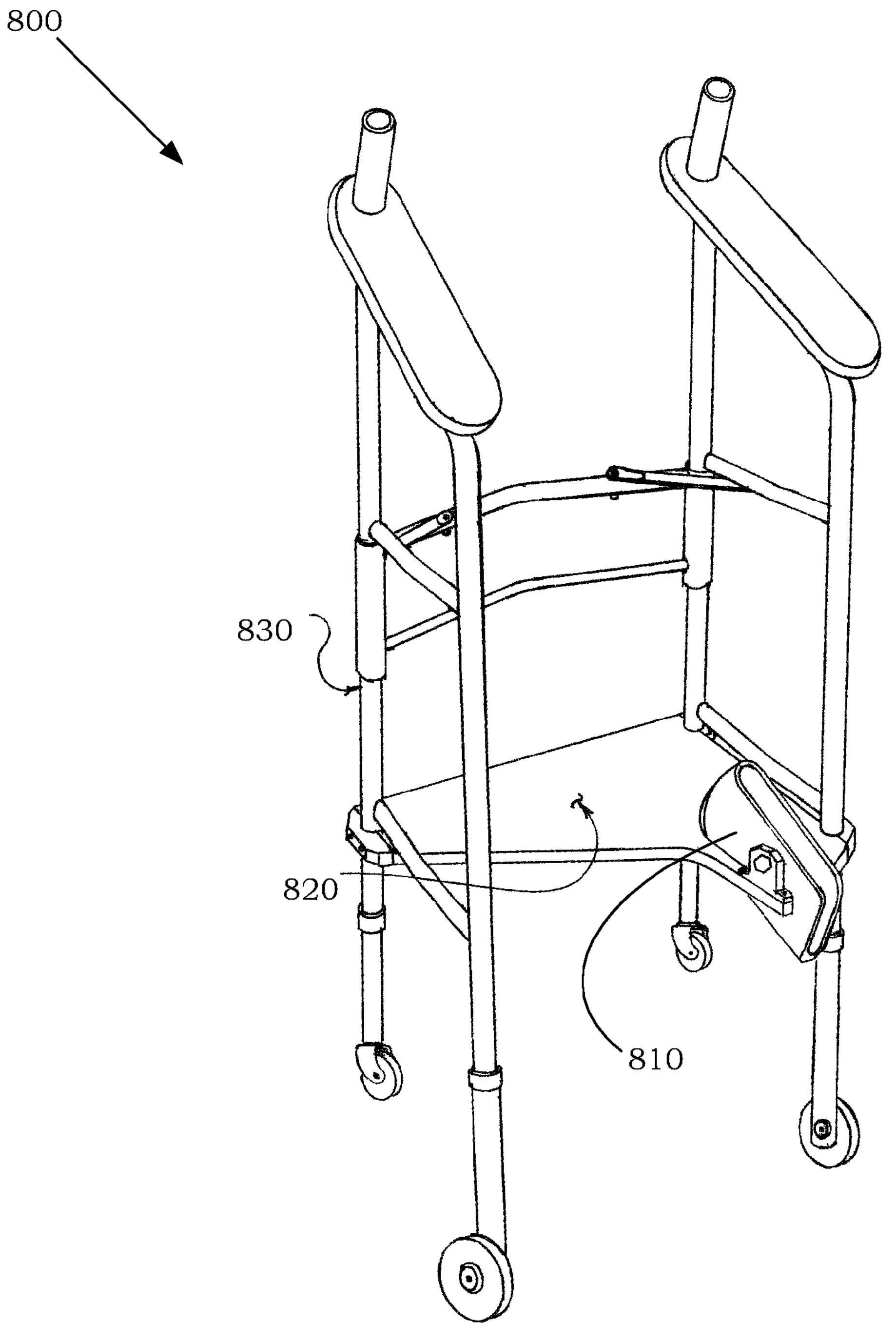
FIG. 8 illustrates a left knee support fixture coupled to an up-right walker according to an embodiment.

FIG. 8 illustrates a left knee support fixture 800 coupled to an up-right walker according to an embodiment. In FIG. 8, the left knee support fixture 800 is shown having a pivoting repository 810 for the left knee to be received therein. The pivoting repository 810 is supported by a support platform 820 that is coupled to the legs 830 of the up-right walker.

Figure 9:
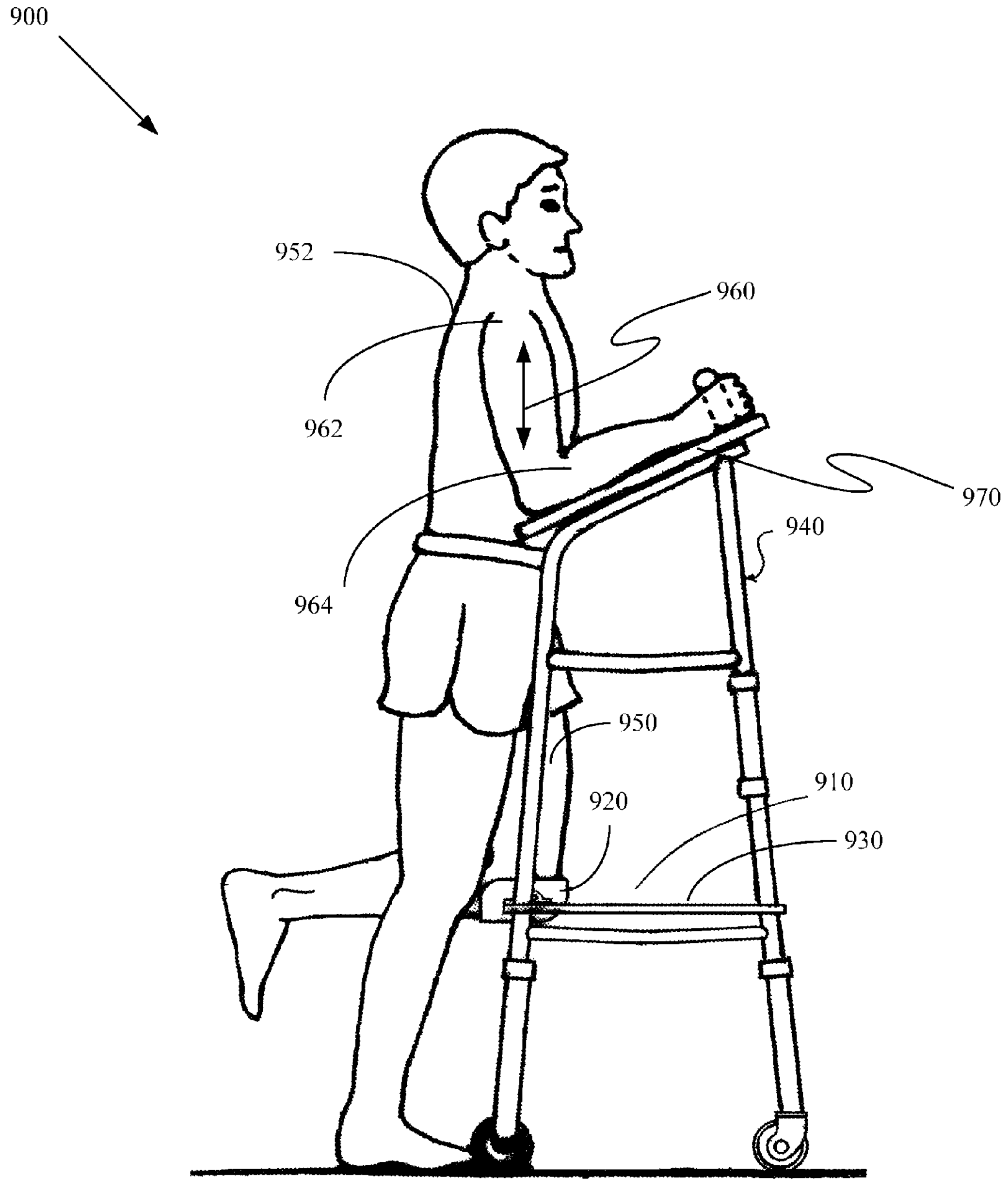
FIG. 9 illustrates a patient using an up-right walker having a left knee support fixture according to an embodiment.
Figure 10A:
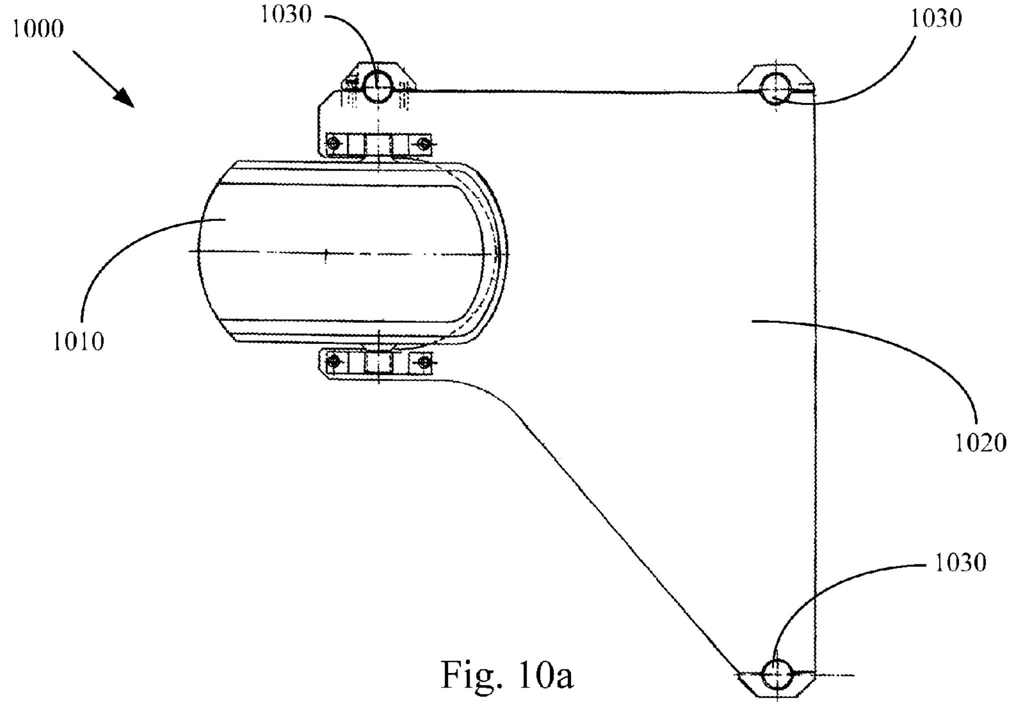
FIG. 10*a* is a top view of a left knee support fixture for an up-right walker according to an embodiment.
Figure 10B:
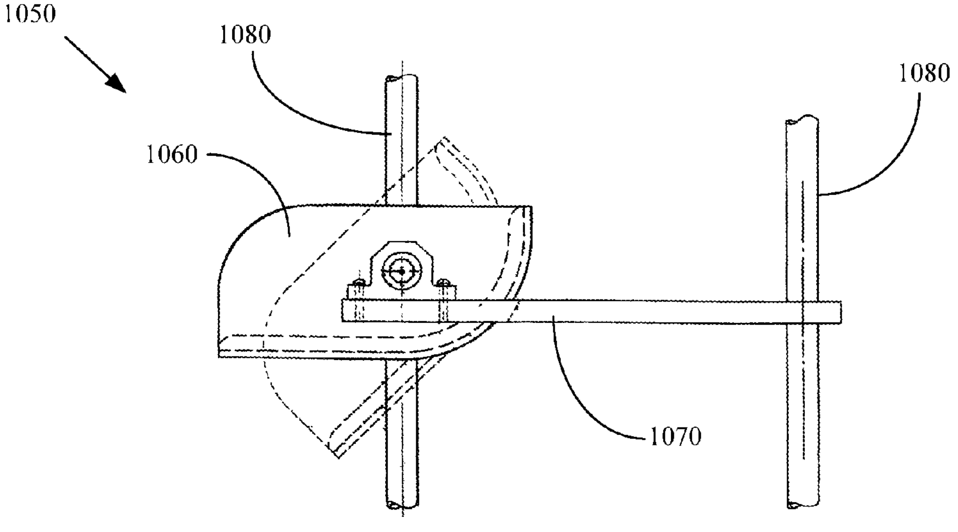
FIG. 10*b* is a side view of a knee support fixture for an up-right walker according to an embodiment.

FIG. 9 illustrates a patient using an up-right walker 900 having a left knee support fixture according to an embodiment. The left knee support fixture 910 is shown having a pivoting repository 920 for the left knee to be received therein. The pivoting repository 920 is supported by a support platform 930 that is coupled to the legs 940 of the up-right walker. The pivoting repository 920 allows the left leg 950 of the patient 952 to be ambulatory without putting weight on the left leg 950. The weight of the patient 952 is still supported by the vertical support 960 from the shoulders 962 to the forearms 964 as the forearms 964 rest on the padded support structure 970.

FIG. **10*a* is a top view of a left knee support fixture 1000 for an up-right walker according to an embodiment. The left knee support fixture has a pivoting repository 1010 for the left knee to be received therein. The pivoting repository 1010 is supported by a support platform 1020 that is coupled to the legs 1030** of the up-right walker.

FIG. **10*b* is a side view of a left knee support fixture 1050 for an up-right walker according to an embodiment. The left knee support fixture has a pivoting repository 1060 for the left knee to be received therein. The pivoting repository 1060 is supported by a support platform 1070 that is coupled to the legs 1080** of the up-right walker.

Figure 11:
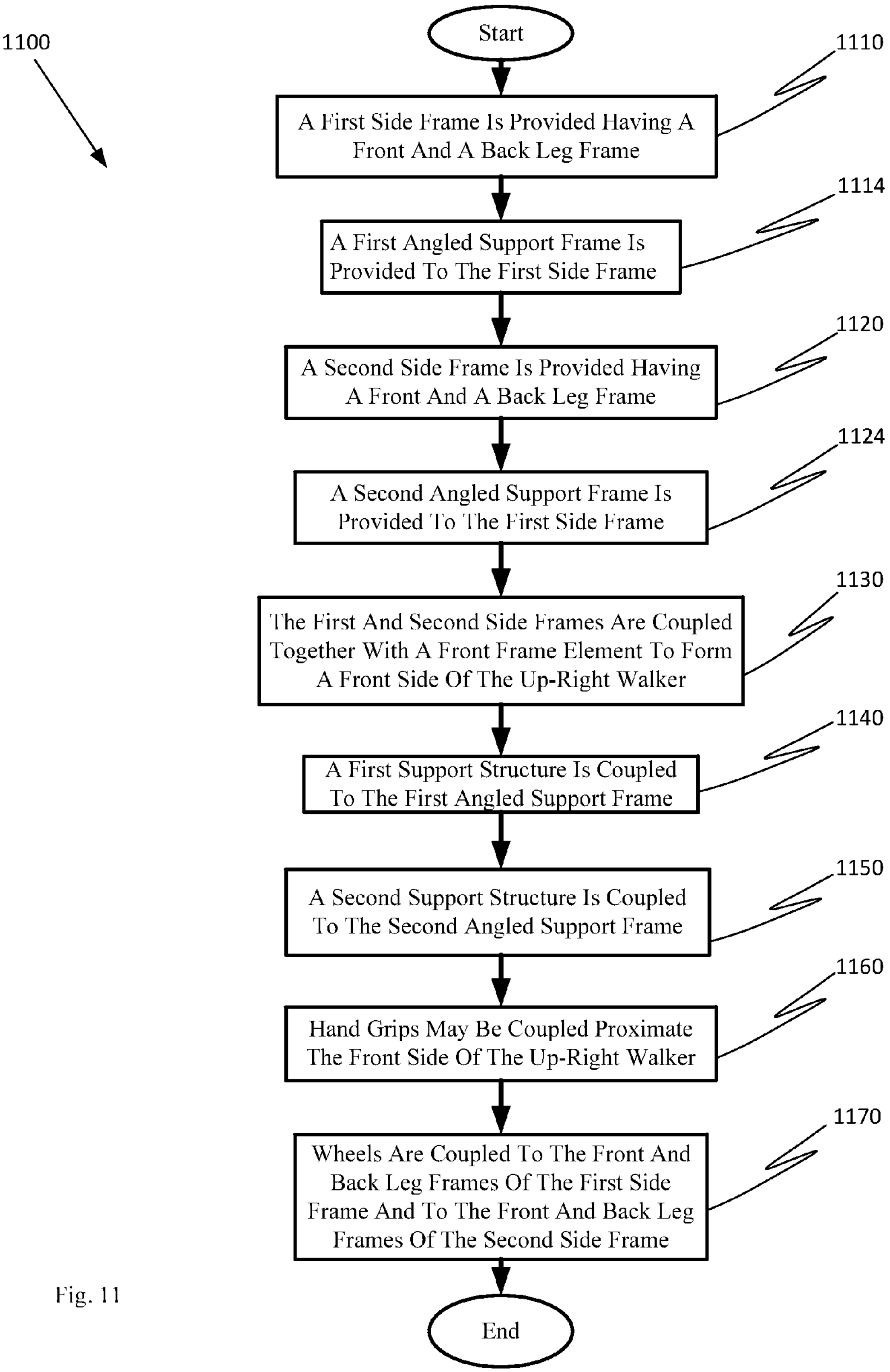
FIG. 11 is a flow chart of a method for providing an up-right walker according to an embodiment.

FIG. 11 is a flow chart 1100 of a method for providing an up-right walker according to an embodiment. In FIG. 11, a first side frame is provided having a front and a back leg frame 1110. A first angled support frame is provided to the first side frame 1114. A second side frame is provided having a front and a back leg frame 1120. A second angled support frame is provided to the first side frame 1124. The first and second side frames are coupled together with a front frame element to form a front side of the up-right walker 1130. The first side frame, the second side frame and the front frame element create a three-sided structure having an opening proximate the back leg frames of the first and second side frames. A first support structure is coupled to the first angled support frame 1140. A second support structure is coupled to the second angled support frame 1150. The first and second support structures provide vertical support to a user from the shoulders to the forearms. Hand grips may be coupled proximate the front side of the up-right walker 1160. Wheels are coupled to the front and back leg frames of the first side frame and to the front and back leg frames of the second side frame 1170.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. An up-right walker, comprising:

a first side frame having a back leg frame and a front leg frame;

a second side frame having a back leg frame and a front leg frame, the second side frame being parallel to the first side frame;

at least one cross member forming a leading edge and coupling the first and second side frames at the front legs of the first and second side frames to provide structural support while providing an opening extending to the leading edge between the first and second side frames at the back legs of the first and second side frames;

wheels coupled to the back leg frame and front leg frame of the first and second side frames, the wheels arranged for contacting a floor surface for enabling motion;

a first support frame disposed at the top of the first side frame and a second support frame disposed at the top of the second side frame;

a first forearm support structure coupled to the first support frame and a second forearm support structure coupled to the second support frame, the first and second forearm support structure configured to have an angled slope not parallel to the floor surface engaged by the wheels; and a first hand grip provided at a first distal end of the first forearm support structure and a second hand grip provided at a first distal end of the second forearm support structure;

wherein the first and second forearm support structure are arranged to hold a user upright by supporting, at a second distal end opposite from the first distal end, elbows of the user when upper arms of the user are in a vertical position to allow the user to walk in an upright position while being supported at the elbows.

2. The up-right walker of claim 1, wherein the first and second support structure enabling positioning of a user closer to first and second front leg frames between the first and second side frames to enable the first and second support structure to provide vertical support to the user thereby allowing an upright position while moving.

3. The up-right walker of claim 1, wherein the sloped angle of the first and second forearm support frame is adjustable.

4. The up-right walker of claim 1, wherein the front wheels are moveably coupled to allow the wheels to turn.

5. The up-right walker of claim 1, wherein the back leg frame includes a curved portion, the back leg frame being coupled to the front leg frame at a front end of the curved portion of the back leg frame.

6. The up-right walker of claim 1, wherein the back leg frame and the front leg frame of the first side frame and the back leg frame and the front leg frame of the second side frame are configured to include couplers for adjusting a height of the first and second support structure relative to the surface engaged by the wheels to position the second distal ends of the first and second support structures at the elbows of the user when the upper arms of the user are vertical to hold the user upright.

7. The up-right walker of claim 1 further comprising a first and second pivot mechanism coupling the first and second side frame to a front cross member for collapsing the first and second side frame inwardly to facilitate storage.

8. The up-right walker of claim 1 further comprising a knee support fixture, wherein the knee support fixture includes a knee support platform coupled to the first side frame and second side frame and a pivoting repository for receiving and supporting a knee therein.

9. A method for providing an up-right walker, comprising:

providing a first side frame having a back leg frame and a front leg frame;

providing a second side frame having a back leg frame and a front leg frame, the second side frame being parallel to the first side frame;

coupling the first and second side frames at the front legs of the first and second side frames using at least one cross member to form a leading edge and to provide structural support while providing an opening extending to the leading edge between the first and second side frames at the back legs of the first and second side frames;

coupling wheels for contacting a floor surface for enabling motion to the back leg frame and front leg frame of the first and second side frames;

providing a first support frame at the top of the first side frame and a second support frame at the top of the second side frame, coupling a first forearm support structure to the first support frame and a second forearm support structure to the second forearm support frame, wherein the coupling of the first and second support structure comprising configuring the first and second support structure to have an angled slope not parallel to the floor surface engaged by the wheels;

providing a first hand grip at a first distal end of the first forearm support structure and a second hand grip at a first distal end of the second forearm support structure; and arranging the coupling the first and second forearm support structure to hold a user upright by supporting, at a second distal end opposite from the first distal end, elbows of the user when upper arms of the user are in a vertical position to allow the user to walk in an upright position while being supported at the elbows.

10. The method of claim 9, wherein the coupling the first support structure to the first support frame and the second support structure coupled to the second forearm support frame further comprises fixedly coupling the first support structure and the second support structure.

11. The method of claim 9, wherein the coupling the first support structure to the first support frame and the second support structure coupled to the second forearm support frame further comprises adjustably coupling the first support structure and the second support structure.

12. The method of claim 9 further comprising coupling the front leg frame to a curved portion of the back leg frame.

13. The method of claim 9 further comprising providing couplers to the back leg frame and the front leg frame of the first side frame and to the back leg frame and the front leg frame of the second side frame for adjusting a height of the first and second support structure relative to the surface engaged by the wheels to position the second distal ends of the first and second support structures at the elbows of the user when the upper arms of the user are vertical to hold the user upright.

14. The method of claim 9 further comprising providing a first and second pivot mechanism for coupling the first and second side frame to a front cross member for collapsing the first and second side frame inwardly to facilitate storage.

15. The method of claim 9 further comprising coupling a knee support platform to the first side frame and second side frame and providing a pivoting knee repository coupled to the knee support platform for receiving and supporting a knee therein.

* * * * *